(12) United States Patent
Edwards (10) Patent No.: US 6,804,034 B2
(45) Date of Patent: Oct. 12, 2004

(54) FLUID CONTAINMENT SUBSTRATES FOR HOLOGRAPHIC MEDIA

(75) Inventor: Jathan D. Edwards, Afton, MN (US)

(73) Assignee: Imation Corp., Oakdale, MN (US)

( * ) Notice: Subject to any disclaimer, the term of this patent is extended or adjusted under 35 U.S.C. 154(b) by 114 days.

(21) Appl. No.: 10/224,013

(22) Filed: Aug. 20, 2002

(65) Prior Publication Data
US 2004/0036931 A1 Feb. 26, 2004

(51) Int. Cl.$^7$ .................................................. G03H 1/02
(52) U.S. Cl. .............................. 359/3; 430/2; 369/282; 156/107
(58) Field of Search .......................... 359/3; 430/1, 2; 369/282, 283, 284, 286, 288, 290; 156/99, 104, 107

(56) References Cited

U.S. PATENT DOCUMENTS

| | | | | |
|---|---|---|---|---|
| 5,095,375 A | * | 3/1992 | Bolt ................................ | 359/1 |
| 5,135,592 A | | 8/1992 | Melvin ......................... | 156/73.1 |
| 5,172,250 A | | 12/1992 | Tsuchiya et al. ................ | 359/1 |
| 5,379,134 A | | 1/1995 | Manitakos .................... | 359/17 |
| 5,504,735 A | * | 4/1996 | Ota et al. ..................... | 369/282 |
| 6,077,629 A | | 6/2000 | Parker et al. .................. | 430/1 |
| 6,160,645 A | | 12/2000 | Chandross et al. ............ | 359/3 |
| 6,670,079 B1 | * | 12/2003 | Kitamura et al. .............. | 430/1 |
| 2002/0145772 A1 | | 10/2002 | Hegel ............................ | 359/3 |

FOREIGN PATENT DOCUMENTS

| | | |
|---|---|---|
| EP | 0 691 564 A1 | 1/1996 |
| JP | 59-201080 | 11/1984 |
| JP | 61014620 | 1/1986 |
| JP | 62063981 | 3/1987 |
| JP | 2001-5368 | 1/2001 |

* cited by examiner

Primary Examiner—Mark A. Robinson
Assistant Examiner—Alessandro Amari
(74) Attorney, Agent, or Firm—Eric D. Levinson (57) ABSTRACT

Holographic data storage media having a sandwiched construction are described in which a holographic recording material is sandwiched between two substrates. The substrates may be formed with fluid containment features in proximity to outer edges of the respective substrates. Also, the substrates may be formed with centerpieces that are recessed relative to the outer surfaces of the respective substrates. Such substrate features can improve and simplify the media fabrication process and may improve media quality.

25 Claims, 9 Drawing Sheets

FLUID CONTAINMENT SUBSTRATES FOR HOLOGRAPHIC MEDIA

FIELD

The invention relates to holographic data storage media, and more particularly to substrates capable of containing a viscous holographic recording material during media fabrication.

BACKGROUND

Many different types of data storage media have been developed to store information. Traditional media, for instance, include magnetic media, optical media, and mechanical media to name a few. Increasing data storage density is a paramount goal in the development of new or improved types of data storage media.

In traditional media, individual bits of information are stored as distinct mechanical, optical, or magnetic changes on the surface of the media. For this reason, data storage medium surface area imposes physical limits on data densities for a given recording technique.

Holographic data storage media can offer higher storage densities than traditional media. In a holographic medium, data can be stored throughout the volume of a holographic recording material. In other words, holographic media permit three-dimensional data storage. Theoretical holographic storage densities can approach tens of terabits per cubic centimeter.

In holographic data storage media, entire pages of information, e.g., bitmaps, can be stored as optical interference patterns within a photosensitive holographic recording material. The optical interference patterns can be generated by intersecting two coherent laser beams within the recording material. The first laser beam, called the object beam, contains the information to be stored; and the second laser beam, called the reference beam, interferes with the object beam to create an interference pattern that can be stored in the recording material as a hologram. When the stored hologram is later illuminated with only the reference beam, some of the light of the reference beam is diffracted by the holographic interference pattern. Moreover, the diffracted light creates a reconstruction of the original object beam. Thus, by illuminating a recorded hologram with the reference beam, the data encoded in the object beam can be recreated and detected by a data detector such as a camera.

Holographic data storage media may have a sandwiched construction in which a photosensitive holographic recording material, such as a photopolymer formulation, is sandwiched between two substrates and then cured. The holograms are recorded and stored in the holographic recording material. The holographic recording material, however, is typically in a viscous fluid or gel-like form when it is originally sandwiched between the substrates. The viscous nature of the holographic recording material can present challenges in media fabrication.

SUMMARY

The invention is directed to holographic data storage media having a sandwiched construction in which a holographic recording material is sandwiched between two substrates. Various substrate features are described that may improve media quality, simplify the manufacturing process, and provide improved environmental stability to the created media.

For example, one or both of the substrates may be formed with fluid containment features in proximity to outer edges of the respective substrates. Also, the substrates may be formed with centerpieces rather than a center hole. The centerpieces may also be recessed relative to outer surfaces of the respective substrates.

In one embodiment, a holographic data storage medium comprises a first substrate, a second substrate, and a holographic recording material between the first and second substrates. At least one of the substrates, and possibly both of the substrates, may be formed to include fluid containment features in proximity to the outer edge(s) of the substrate(s). The fluid containment features may serve to define a cavity between the substrates that can contain a holographic recording material when the material is in a viscous form.

The fluid containment features may also provide a vent gap through which gas can escape from the cavity when the holographic recording material is injected. Furthermore, in addition to providing advantages in the containment of the holographic recording material when the material is in a viscous form, the fluid containment features may also provide an environmental barrier between the holographic recording material and the environment after the holographic recording material is cured.

In another embodiment, the substrates may be formed with centerpieces rather than center holes commonly formed in optical substrates. The centerpieces may serve to more completely encapsulate the cavity, and thereby contain injected holographic recording material within the cavity. Furthermore, the centerpieces may be recessed relative to outer surfaces of the respective substrates.

By recessing the centerpieces relative to outer surfaces of the respective substrates, flatness of the outermost surfaces of the substrates can be improved, allowing the reference planes of a manufacturing device to define improved parallelism between the outer surfaces during the media manufacturing process. In particular, recessed centerpieces may avoid problems caused by thickness variations in proximity to the centerpieces. Therefore, the outer surfaces of the substrates can be forced against reference planes during the media manufacturing process so that the outer surfaces are substantially parallel to one another, without being inhibited by thickness variations in proximity to the centerpieces.

In another embodiment, the invention is directed to a set of substrates for use in a sandwiched construction data storage medium in which a viscous material is sandwiched between a first substrate and a second substrate during fabrication of the medium. The set of substrates may comprise a first substrate including a first fluid containment feature formed in proximity to an outer edge of the first substrate, and a second substrate including a second fluid containment feature formed in proximity to an outer edge of the second substrate.

In another embodiment, the invention may be directed to a holographic data storage system. For example, the system may include a laser that produces at least one laser beam, optical elements through which the laser beam passes, a data encoder that encodes data in at least part of the laser beam, and a holographic recording medium that stores at least one hologram. The holographic recording medium may include a first substrate, a second substrate, and a holographic recording material between the first and second substrates. One or both of the substrates may be formed with one or more of the substrate features described herein.

In another embodiment, the invention may be directed to a method of fabricating a holographic recording medium.

For example, the method may include positioning a first substrate relative to a second substrate to define a cavity, the first substrate including a first fluid containment feature formed in proximity to an outer edge of the first substrate, and the second substrate including a second fluid containment feature formed in proximity to an outer edge of the second substrate such that the cavity is defined by inner surfaces of the first and second substrates and at least one of the first and second fluid containment features. The method may further include injecting a viscous holographic recording material into the cavity, and curing the holographic recording material.

The various embodiments may be capable of providing one or more advantages. In particular, the substrate features described herein may improve media quality, simplify and improve the manufacturing process associated with media fabrication, and may provide improved environmental stability to the created media. Additional details of these and other embodiments are set forth in the accompanying drawings and the description below. Other features, objects and advantages will become apparent from the description and drawings and from the claims.

DETAILED DESCRIPTION

In general, the invention is directed to a holographic data storage medium having a sandwiched construction in which a holographic recording material is sandwiched between two substrates. The substrates may be formed with fluid containment features in proximity to outer edges of the respective substrates. Also, the substrates may be formed with centerpieces rather than a center hole. The centerpieces may be recessed relative to outer surfaces of the respective substrates. Such substrate features can improve and simplify the media fabrication process and may also improve media quality, The substrates may define a cavity into which holographic recording material can be injected. In particular, the fluid containment features formed in proximity to the outer edges of the substrates can define the outer edge of the cavity formed between the two substrates. Accordingly, the fluid containment features can serve to contain the holographic recording material within the cavity when the holographic recording material is viscous, i.e., in a substantially liquid or gel-like form during media fabrication. The holographic recording material can be injected into the cavity, where it is contained by the fluid containment features of the substrates, and the holographic recording material can be cured. After curing, the fluid containment features may also protect the holographic recording material from environmental elements.

The fluid containment features may assume a wide variety of shapes and configurations. In the exemplary embodiments outlined in greater detail below, the fluid containment features define lip-like elements formed about an outer perimeter of the respective substrate. The fluid containment features may extend in a direction perpendicular to a major surface of the respective substrates. Accordingly, the substrates can define top and bottom surfaces of the medium as well as a cavity between the substrates. The fluid containment features of the top and bottom substrates may fit together, e.g., in an abutting fashion, to substantially seal the cavity when the holographic recording material is cured therein. Furthermore, during injection of the holographic recording material into the cavity, a vent gap may be present between the fluid containment features, allowing gas to escape from the cavity during injection so that the cavity can be more completely filled with the holographic recording material in liquid or gel-like form.

Pressure caused by injection of the holographic recording material into the cavity can force air to escape through the vent gap. Moreover, upon filling the cavity, the pressure may push the fluid containment features of the top and bottom substrates together to substantially eliminate the vent gap once gas has escaped. If any spacing remains between the fluid containment features after injection of the holographic recording material, the remaining spacing can be eliminated during the curing of the holographic recording material, which typically results in slight shrinkage of the material. This shrinkage that occurs during cure can eliminate any remaining vent gap, causing the fluid containment features to abut one another and seal the cavity.

The fluid containment features can improve and simplify media fabrication. In particular, fluid containment features can contain the holographic recording material between the two substrates when the holographic recording material is in liquid or gel-like form, and can avoid leakage of the holographic recording material from the cavity. Such fluid containment features may facilitate mass-production of holographic media in which a viscous holographic recording material is injected between two substrates and cured. In addition, the fluid containment features may improve environmental stability of holographic media by providing a substrate barrier between the environment and the cured holographic recording material in the media, specifically at the outer perimeters of the media.

The substrates may also be formed with centerpieces that are recessed relative to outer surfaces of the respective substrates. Also, at least one of the centerpieces may be formed with an injection channel through which the holographic recording material can be injected during fabrication of the medium. For example, a center injection process can be used to inject the holographic recording material through the injection channel and into the cavity defined by the substrates and the fluid containment features. The center injection process can force the top and bottom substrates away from one another to press outer surfaces of the substrates onto substantially parallel reference planes of a manufacturing device during fabrication.

By recessing the centerpieces relative to outer surfaces of the respective substrates, flatness of the outer surface of the substrates can be improved, allowing the reference planes of the manufacturing device to define improved parallelism between the outer surfaces of the substrates. In particular, recessed centerpieces may avoid problems caused by thickness variations in proximity to the centerpieces. Such thickness variations may occur because of differential cooling of the substrates during fabrication, and are sometime referred to as "edge wedge" effects. When the centerpieces are recessed, however, problems associated with the edge wedge effects in proximity to the centerpieces can be avoided. Hence, the outer surfaces of the substrates can be pressed against the reference planes during fabrication without hindrance from thickness variations in proximity to the centerpieces, because the centerpieces are recessed relative to the outer surfaces of the substrates. Accordingly, improved parallelism between the outer surfaces of the substrates relative to one another can be achieved, which can improve media quality and possibly increase storage densities.

Figure 1:
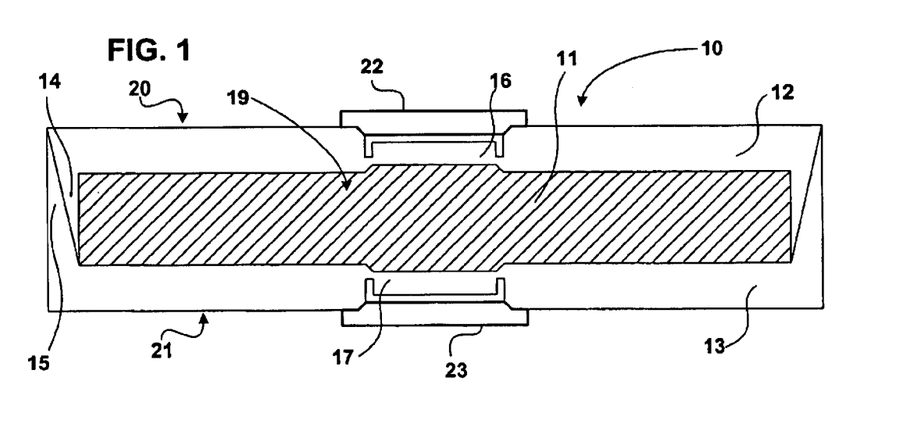
FIG. 1 is a cross-sectional side view of an exemplary holographic data storage medium according to an embodiment of the invention.
Figure 2:
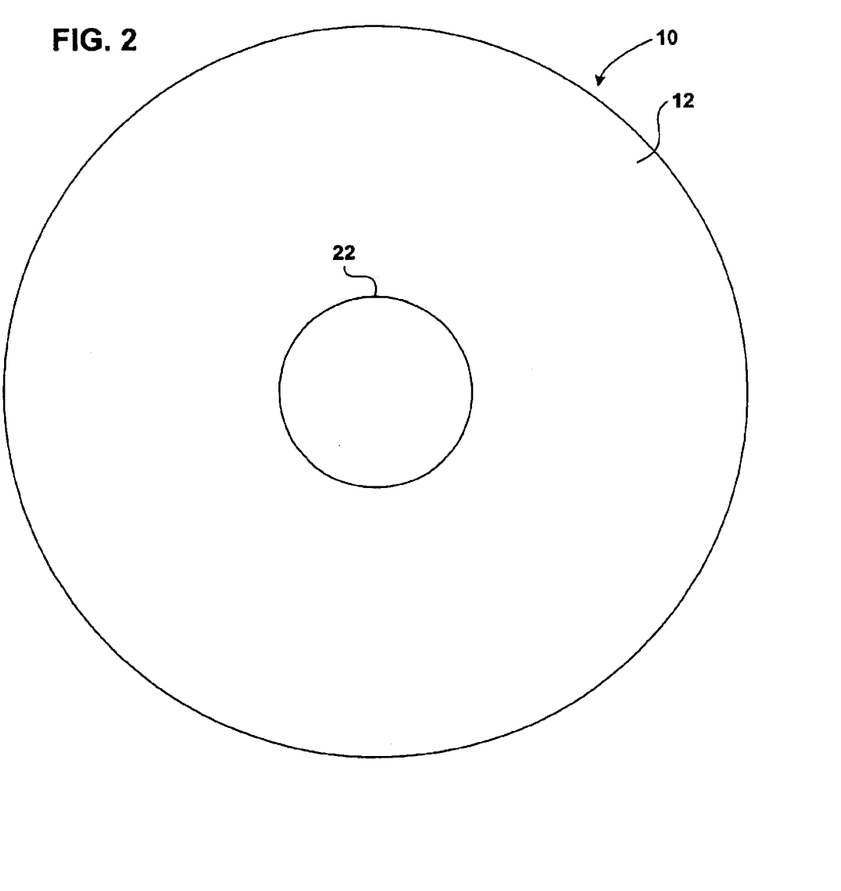
FIG. 2 is a top view of the holographic data storage medium illustrated in FIG. 1.

FIG. 1 is a cross sectional side view of an exemplary holographic data storage medium 10. FIG. 2 is a top view of holographic data storage medium 10. As illustrated, holographic data storage medium 10 may take the form of a rotatable disk. Alternatively, holographic data storage medium 10 may take the form of a rectangular card, or any other shape. In any case, holographic data storage medium 10 has a sandwich construction in which a photosensitive holographic recording material 11 is sandwiched between the two substrates 12, 13. As outlined in greater detail below, substrates 12, 13 can be formed with various features to improve media quality and manufacturability.

In particular, substrates 12, 13 may include fluid containment features 14, 15 that serve to contain holographic recording material 11 within cavity 19 prior to curing holographic recording material 11. Holographic recording material 11 may be viscous prior to curing, e.g., typically having a viscosity between approximately 200 and 3000 centipoise. Fluid containment features 14, 15 can contain material 11 when it is in such a viscous form. In addition, fluid containment features 14, 15 may also provide an environmental barrier between holographic recording material 11 and the environment outside cavity 19 after curing of holographic recording material 11.

Substrates 12, 13 may also include recessed centerpieces 16, 17, which can improve media quality and manufacturability by allowing outer surfaces 20, 21 to be pressed against reference planes during the fabrication process without being adversely affected from thickness variations near centerpieces 16, 17. Optionally, a hub 22, 23 may be attached to one or both centerpieces 16, 17.

Centerpieces 16, 17 may add several other potential benefits to medium 10, such as improved encapsulation of cavity 19, a reference point for registration of substrates 12, 13 within a disk manufacturing apparatus, a center hole punching location defined by the location of the centerpieces 16, 17, or a hub attachment mechanism to which an optional hub 22 or 23 may be attached to medium 10.

By way of example, substrates 12, 13 may comprise an optically transparent material such as an optically transparent thermoplastic material. Example materials useful in forming substrates 12, 13 include: polycarbonate, polymethylmethacrylate (PMMA), and amorphous polyolefin. The outer surfaces of one or both of substrates 12, 13 may be coated with an anti-reflective coating.

Polycarbonate, polymethylmethacrylate (PMMA) and amorphous polyolefin are particularly attractive candidate materials for substrates 12 and 13 because these thermoplastic materials can be injection molded at relatively low cost. For injection molded substrates, several factors may determine which substrate material is best suited for media fabrication. For instance, the substrate material should be capable of confining a viscous formulation during the fabrication process. In addition, it may be desirable to provide a substrate material capable of exhibiting surface variations, e.g., embossed or molded surface variations, that can carry precision tracking and/or pre-format information. The substrate material should also be capable of encapsulating the holographic recording material to protect the holographic recording material from environmental contamination following manufacture. In addition, the substrate material should have relatively low birefringence. Birefringence is generally a measure of the variation of the index of refraction with orientation in the material. Large variations in the index of refraction with orientation, for instance, are generally undesirable for holographic media substrate materials.

Additionally, a substrate material should be chosen so that surface reflection and intrinsic optical scattering are minimized as much as possible. Moreover, the medium may need an anti-reflection coating, and thus, it is desirable to use a substrate material to which an anti-reflective coating can be applied. In addition, as indicated above, material cost may be a factor. Considering all these factors, the thermoplastic material referred to as amorphous polyolefin (APO) appears to be well suited as a substrate material for use in holographic media. In addition to meeting the design criteria above, APO does not absorb water vapor. Therefore, if APO is used as a holographic medium substrate, an anti-reflective coating can be applied to the medium without the need to bake or de-gas the substrate.

The desired thickness of substrates 12 and 13 in the area inside features 15, 16 may fall between approximately 0.5 millimeters and 1.3 millimeters. Birefringence may be too high if the substrate thickness is less than approximately 0.5 millimeters, and thickness variations caused by differential cooling of the thermoplastic material during the injection molding process may become more prominent if substrate thickness is greater than approximately 1.3 millimeters. Therefore, approximately 0.5 millimeters to 1.3 millimeters may represent the desired range for thermoplastic substrates used in sandwich construction holographic data storage media, and APO may be the most suitable thermoplastic material for such substrates.

Holographic recording material 11 may comprise a matrix polymer resulting from the mixture of two or more oligomeric components. A photoinitiator can be mixed in a first oligomeric component, and a write monomer can be mixed in a second oligomeric component. An additive may also be dissolved in one of the oligomeric components. For example, an oxidant and possibly a catalyst may also be mixed in one of the oligomeric components. Typically the oxidant and the catalyst (if desired) are dissolved in the second oligomeric component that has the monomer dissolved therein. Copending and commonly assigned application Ser. No. 10/186,378, filed Jun. 27, 2002 by Hegel et al. entitled RECORDING MATERIAL FORMULATIONS FOR HOLOGRAPHIC MEDIA, describes in detail various holographic material formulations that may be useful. The entire content of the above-identified application Ser. No. 10/186,378 is incorporated herein by reference.

During media fabrication, the formulations can be mixed in an in-line static mixing process in order to ensure that the material 11 does not cure until after it is injected between the substrates 12, 13. Material 11 may assume a viscous liquid or gel-like state when mixed together, and may cure over time. Accordingly, material can be center injected into cavity 19 when in a viscous form and then cured in situ to define a more rigid form. In some cases, electromagnetic energy, heat, or chemicals may be used to speed the curing process after the holographic recording material 11 is injected between substrates 12, 13.

Figure 3:
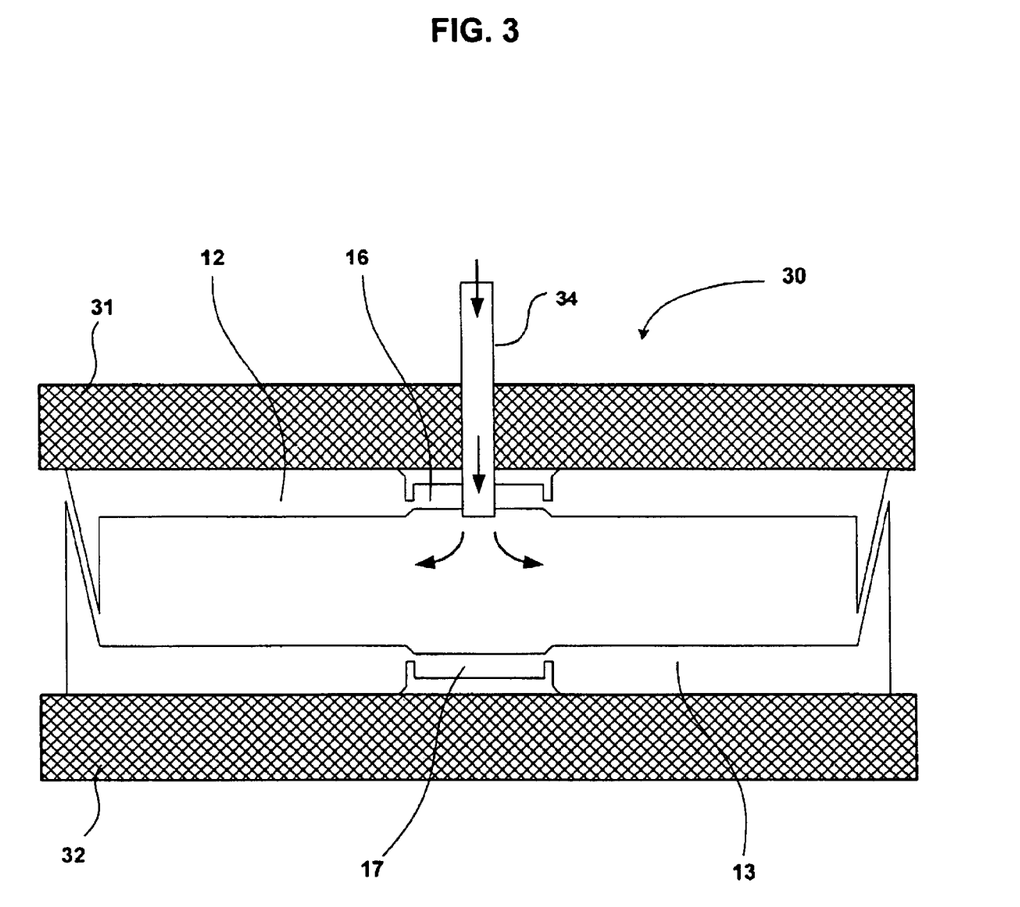
FIG. 3 is a cross-sectional side view illustrating the creation of a holographic medium via a center injection process.

FIG. 3 is a cross-sectional side view of the creation of a holographic medium via a center injection process. As shown in FIG. 3, substrates 12 and 13 are positioned within a manufacturing apparatus 30. Manufacturing apparatus 30 includes upper and lower reference planes 31 and 32 that are substantially parallel to one another. Manufacturing apparatus 30 also includes a center dispensing device 34 through which the holographic recording material can be injected between substrates 12 and 13. Prior to injection of the holographic recording material, center dispensing device 34 may inject nitrogen or another gas to condition cavity 19 and remove gasses that could impact the curing process.

The top substrate 12 may be formed with an injection channel as described in greater detail below, through which the holographic recording material can be injected into cavity 19. The arrows in FIG. 3 conceptually illustrate the center injection of holographic recording material between substrates 12 and 13.

The hydraulic pressure associated with the injection of holographic recording material between substrates 12 and 13 forces the respective substrates 12, 13 against the reference planes 31, 32. In this manner, the outer surfaces 20, 21 (FIG. 1) of the resultant medium 10 (FIG. 1) can be made substantially parallel relative to one another. If desired, reference planes 31, 32 may also include vacuum draws (not shown) that draw the respective substrates 12, 13 against the reference planes 31, 32. In any case, the ability to press substrates 12, 13 against the reference planes 31, 32 in a manner that causes the outer surfaces of substrates 12, 13 to be substantially parallel can be improved by recessing the respective centerpieces 16, 17. As mentioned, such recessing can avoid thickness variations in proximity to centerpieces 16, 17 from undermining the parallelism of outer surfaces 20, 21 (FIG. 1). Improved parallelism is highly desirable because the parallelism between outer surfaces 20, 21 can impact media quality and storage density.

In addition, the mere precedence of centerpieces 16, 17 can improve encapsulation of holographic recording material 11 within medium 10 relative to conventional substrates used for optical media that define a relatively large center hole. Centerpieces 16, 17 may be integrally molded to form part of substrates 12, 13 during an injection molding process used to create substrates 12, 13.

Figure 4:
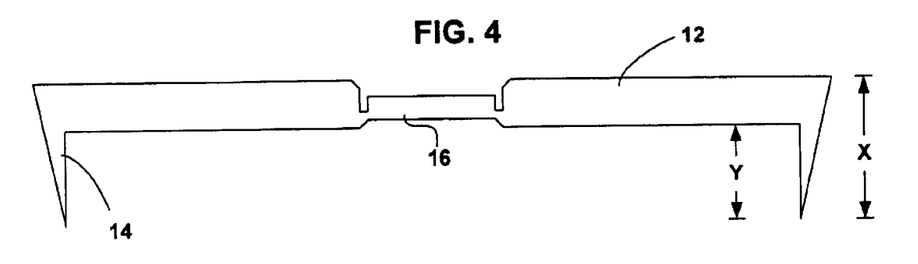
FIG. 4 is a cross-sectional side view of an exemplary top substrate that can be used in a holographic data storage medium.
Figure 5:
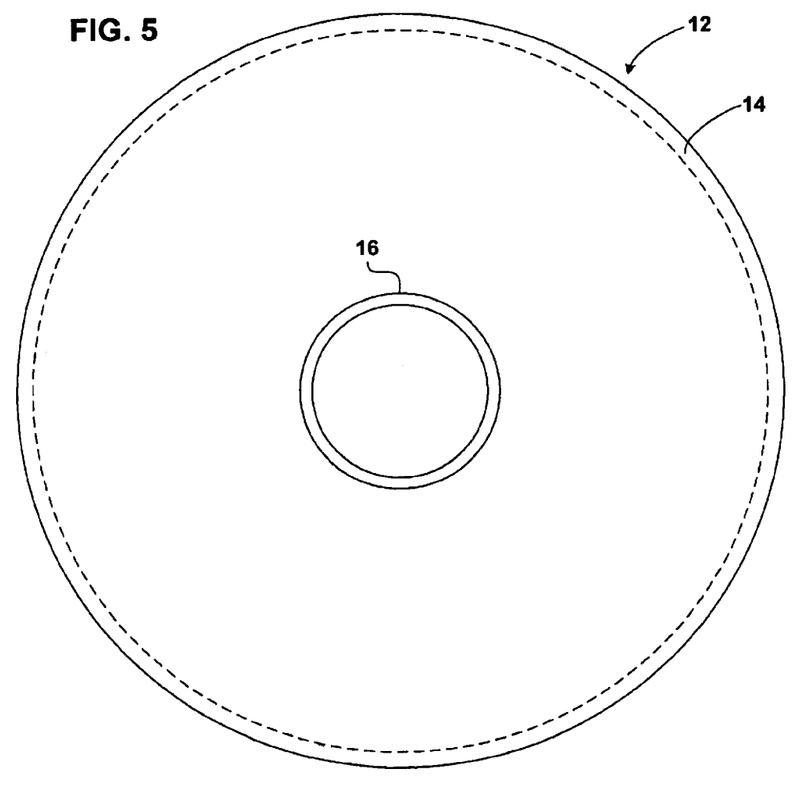
FIG. 5 is a top view of the top substrate illustrated in FIG. 4.

FIG. 4 is a cross-sectional side view of an exemplary top substrate 12 for use in a sandwiched construction data storage medium. FIG. 5 is a top view of top substrate 12 of FIG. 4. As illustrated, top substrate 12 includes a recessed centerpiece 16 and a fluid containment feature 14 in proximity to its peripheral edge. The fluid containment feature 14 may define a lip-like element around the outer perimeter of substrate 12.

The fluid containment feature 14 of top substrate 12 may define an inner height of a distance Y. The inner height of top substrate 12 refers to the height from the bottom major surface of substrate 12 to the tip of fluid containment feature 14. In addition, the fluid containment feature 14 of top substrate 12 may define an outer height of a distance X, which corresponds to the height from the top major surface of substrate 12 to the tip of fluid containment feature 14. The difference between the distance X and Y may be approximately equal to the thickness of substrate 12.

Figure 6:
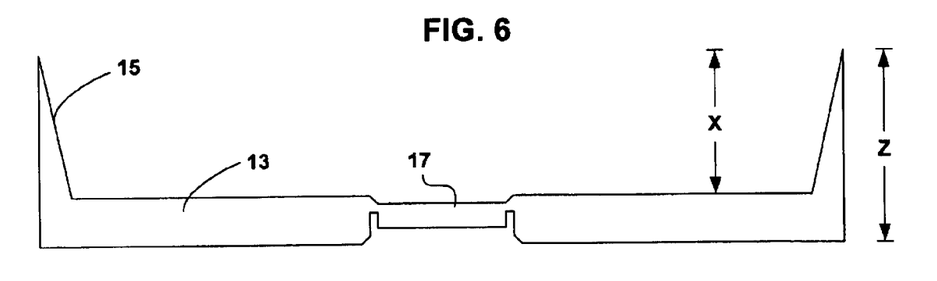
FIG. 6 is a cross-sectional side view of an exemplary bottom substrate that can be used in a holographic data storage medium.
Figure 7:
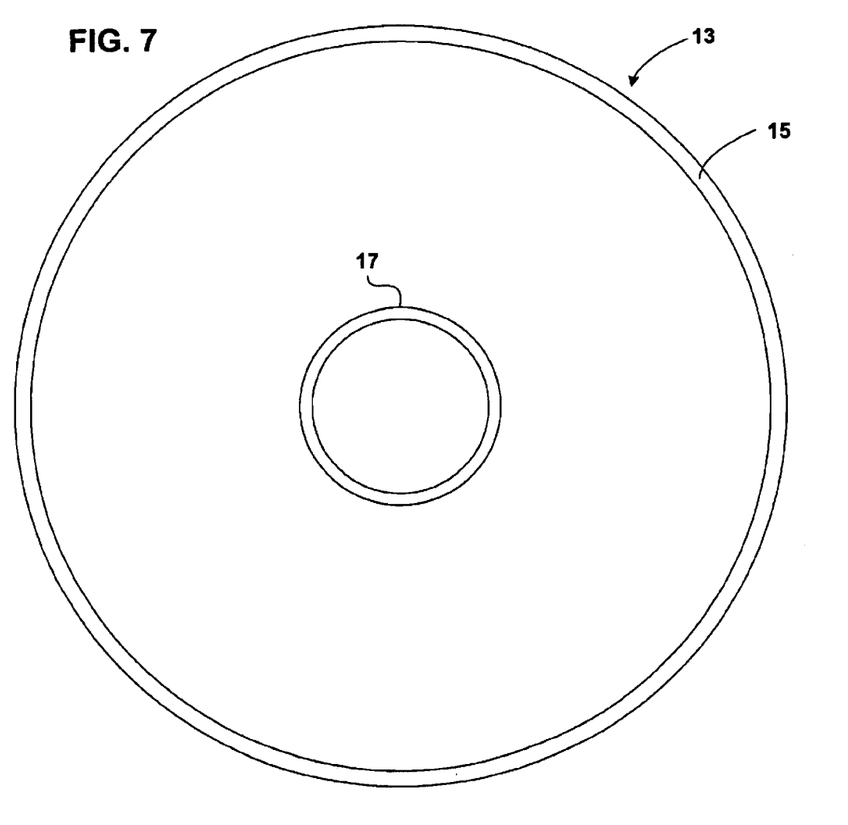
FIG. 7 is a top view of the top substrate illustrated in FIG. 6.

FIG. 6 is a cross-sectional side view of an exemplary bottom substrate 13 for use in a sandwiched construction data storage medium. FIG. 7 is a top view of the bottom substrate 13 illustrated in FIG. 6. Like top substrate 12, bottom substrate 13 includes a recessed centerpiece 17 and a fluid containment feature 15 in proximity to its peripheral edge. Also, the fluid containment feature 15 may define a lip-like element around the outer perimeter of substrate 13.

The fluid containment feature 15 of bottom substrate 13, however, may be sized slightly different than that of top substrate 12. For example, fluid containment feature 15 may define an inner height of a distance X, which may be approximately equal to the outer height associated with fluid containment feature 14 of top substrate 12. The inner height of bottom substrate 13 refers to the height from the top major surface of substrate 13 to the tip of fluid containment feature 15. In addition, the fluid containment feature 15 of bottom substrate 13 may define an outer height of a distance Z, which corresponds to the height from the bottom major surface of substrate 13 to the tip of fluid containment feature 14. The difference between the distance Z and X may be approximately equal to the thickness of substrate 13.

Features 14, 15 may have triangular cross-sectional shapes as illustrated in FIGS. 4 and 6, or may assume a wide variety of other shapes. If features 14, 15 have triangular cross-sectional shapes, the angle of the features relative to plane normal to the surfaces of substrates 12, 13 may be in the range of approximately 5 to 15 degrees. By way of example, features 14, 15 may define an average width between approximately 0.1 and 1.0 millimeters although the invention is not necessarily limited in that respect.

Figure 8:
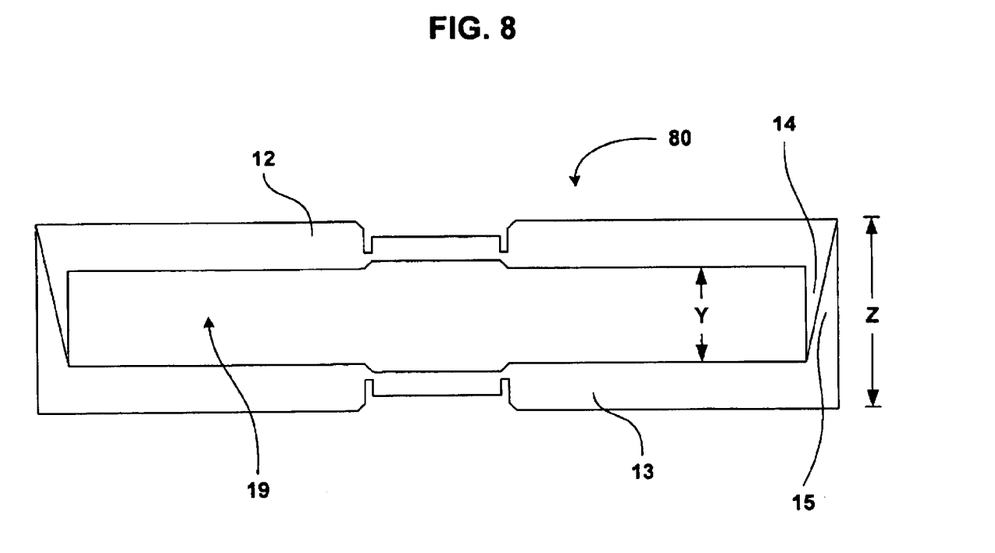
FIG. 8 is a cross-sectional side view of a set of substrates that can be used in a holographic data storage medium.

As illustrated in FIG. 8, top and bottom substrates 12, 13 define a substrate set 80 that can be used to create a holographic medium. The cavity formed between the substrates may have a thickness of Y, which approximately corresponds to the inner thickness of fluid containment feature 14 of top substrate 12. The substrates 12, 13 of set 80 fit together in a mated fashion. In other words, fluid containment feature 14 and fluid containment feature 15 define a substantially inverse shape of one another so that substrates 12 and 13 fit together and stay positioned relative to one another as a result of gravitational pull. Feature 15 may define a perimeter lip-like element that fits into the perimeter lip-like element defined by feature 14, or vice versa. If desired, an adhesive may be added to bond substrates 12 and 13 together at the interface of features 15, 16 after the center injection of the holographic material.

In other embodiments, the actual shape of features 14 and 15 are subject to a wide to variety of forms. The best shape from an overall manufacturing standpoint may depend on both the ability to achieve the desired venting from cavity 19 during manufacture of medium 10, as well as the ease in which the features can be injection molded during manufacture of the substrates 12, 13. In any case, if substrates 12 and 13 fit together and stay positioned relative to one another as a result of gravitational pull, media fabrication can be simplified. In that case, set 80 can be inserted within manufacturing apparatus 30 (FIG. 3) very easily, possibly via an automated manufacturing process. Features 14 and 15 can serve to pre-position substrates 12 and 13 relative to one another, and may facilitate common insertion of set 80 into manufacturing apparatus 30.

Figure 9:
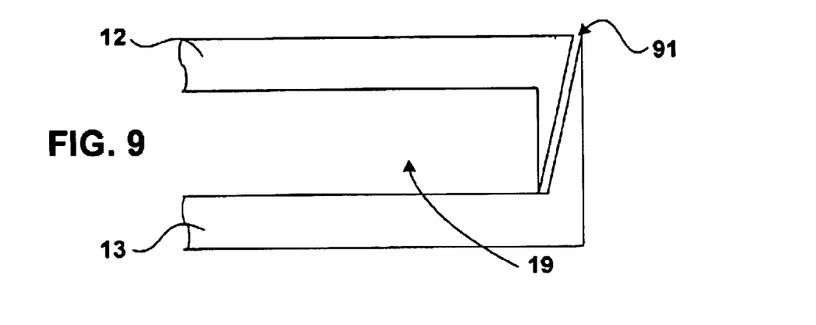
FIGS. 9–12 are cross-sectional side views of a portion of a holographic data storage medium during a fabrication process in which a holographic recording material is injected between two substrates.
Figure 10:
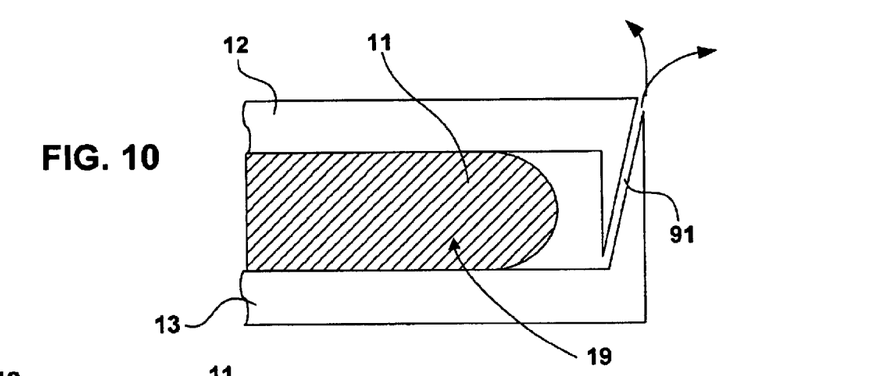

FIGS. 9–12 are enlarged cross sectional views of a portion of substrates 12 and 13 during the process in which the viscous holographic recording material is injected between the substrates 12, 13. As shown in FIG. 9, initially, a relatively small vent gap 91 may be present between features 14 and 15. By way of example, vent gap 91 may define a width of approximately 0.1 millimeter. Accordingly, vent gap 91 can allow gas to escape from cavity 19 (as conceptually illustrated by the arrows in FIG. 10) as viscous holographic recording material 11 is center dispensed between substrates 12, 13.

Figure 11:
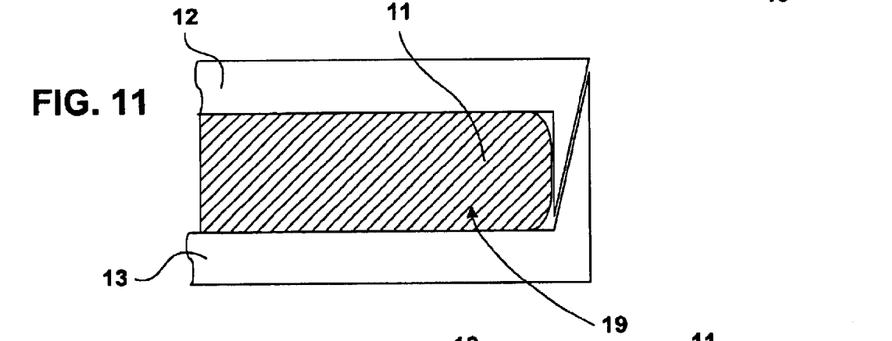

As shown in FIG. 11, when the holographic recording material 11 approaches the peripheral edge of cavity 19, hydraulic pressure associated with the injected holographic recording material 11 may cause vent gap 91 to begin closing. In other words, the pressurized injection of holographic recording material 11 may force gas out of cavity 19, and may then force features 14 and 15 together in an abutting fashion to seal cavity 19. In some cases, it may be desirable to purposely mold features 14 and 15 to exhibit a small amount, e.g., 10–30 microns of cupping inward toward cavity 19. In that case, pressurized injection of material may push against the cupped fluid containment features to close the vent gap as pressure increases. The thermoplastic material used for substrates 12, 13 may need to be sufficiently flexible to ensure that vent gap 91 is able to close in response to pressure.

The shape of features 14, 15 may also be defined in a manner that ensures sufficient flexibility to allow vent gap 91 to close in response to pressurized injection of holographic recording material 11. On the other hand, features 14, 15 may also need to be defined in a manner that ensures sufficient rigidity to ensure that the hydraulic pressure of the injection of holographic recording material 11 does not break or otherwise overcome features 14, 15.

Figure 12:
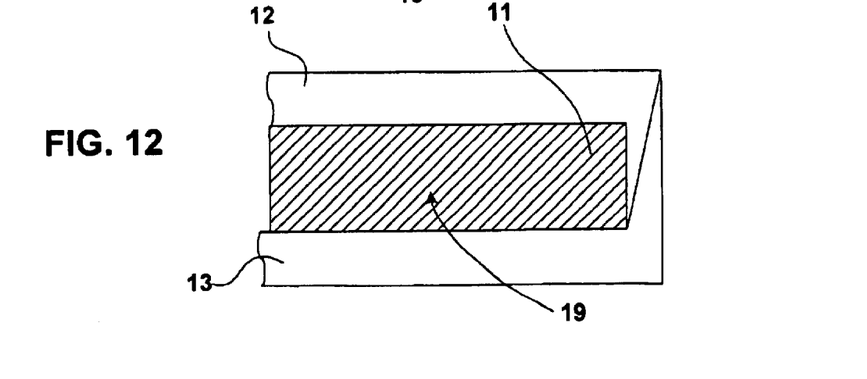

FIG. 12 illustrates a portion of substrates 12 and 13 with a cured holographic recording material 11 filling the cavity 19 defined by the substrates 12, 13. The curing process may cause slight shrinkage of holographic recording material 11 which can eliminate any remaining gap between features 14 and 15, and ensure that features 14 and 15 abut one another to seal cavity 19. In some embodiments, it may also be desirable to define the height of vent gap 91 to approximately correspond to the thickness reduction of cavity 19 that will result from shrinkage of material 11 as it cures.

Features 14 and 15 may also provide the added benefit of an environmental barrier, e.g., a hermetic barrier, between holographic recording material 11 and the environment. Accordingly, medium 10 (FIG. 1) may be more environmentally stable, and possibly more reliable than conventional sandwiched construction media. An edge sealing coating, for example, at the juncture of features 14 and 15 may also be added to improve environmental encapsulation of holographic recording material 11.

Figure 13:
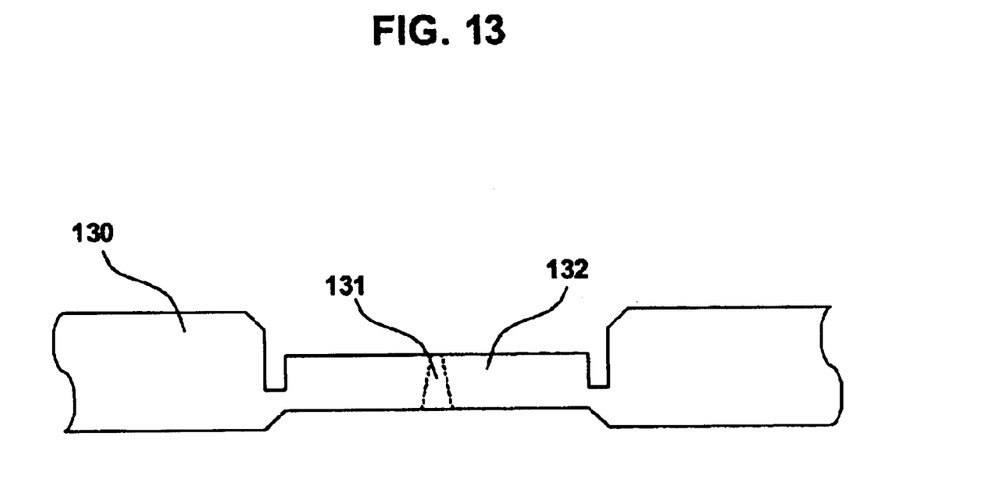
FIG. 13 is a cross-sectional side view of a portion of a substrate illustrating an injection channel formed in a centerpiece of the substrate.

FIG. 13 is a cross-sectional side view of a portion of a substrate 130 illustrating an injection channel 131 formed in a centerpiece 132 of the substrate. Injection channel 131 may be formed as part of an injection mold used to create substrate 130. Substrate 130 may correspond to either of substrates 12, 13 outlined above. By way of example, injection channel 131 may have a diameter greater than approximately 0.5 millimeters in order to ensure that material can be injected through the channel 131, but less than approximately 3.0 millimeters in order to ensure that cavity 19 (FIG. 1) is substantially encapsulated. In any case, injection channel 131 can provide a conduit through which holographic recording material 11 can be center injected into cavity 19 as illustrated in FIG. 3.

Figure 14:
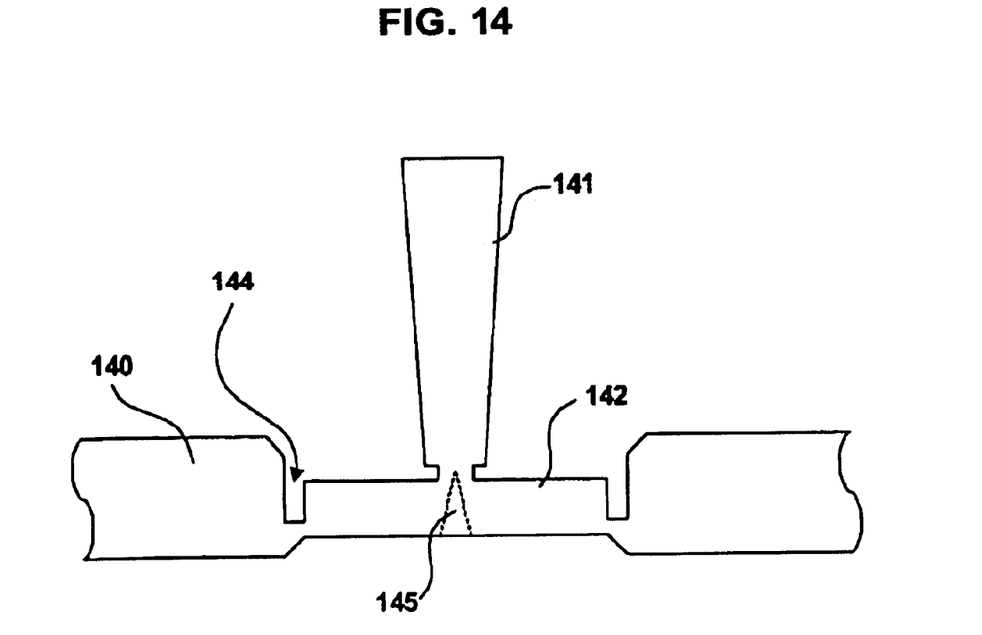
FIG. 14 is a cross-sectional side view of a portion of a substrate illustrating a runner formed on the centerpiece of the substrate.

FIG. 14 is a cross-sectional side view of a portion of a substrate 140 illustrating a runner 141 formed on the centerpiece 142 of the substrate 140. Runner 141 may be viewed as a bi-product of the injection molding process used to create substrate 140. In particular, runner 141 may correspond to a portion of a channel through which molten thermoplastic material is dispensed into an injection molding cavity to create substrate 140. If the runner cools to form part of substrate 140 as illustrated in FIG. 14, it is referred to as a "cold runner." In other cases, the runner may be "hot," such that it does not form part of the created substrate. A cold runner 141 may be used as a handle by automated components to remove substrate 140 from a mold. Runner 141 can then be removed before substrate 140 is used to create a data storage medium. Centerpiece 142, however, may remain part of substrate 140.

In order to form injection channel 131 (FIG. 13), a conically-shaped feature 145 may be formed into substrate 140 as part of the injection molding process. Feature 145, for example, may extend through centerpiece 142 and into a portion of runner 141. Then, when runner 141 is removed, injection channel 131 (FIG. 13) can be exposed.

Figure 15:
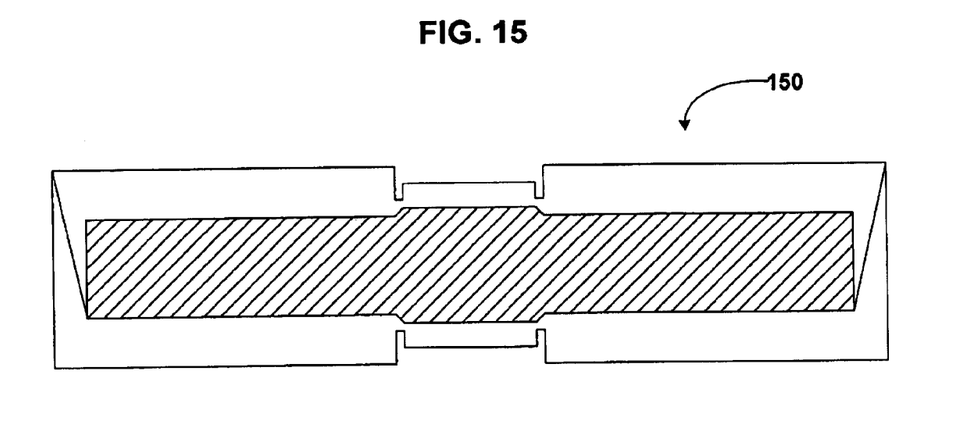
FIGS. 15 and 16 are additional cross-sectional side views of an exemplary holographic data storage media according to embodiments of the invention.
Figure 16:
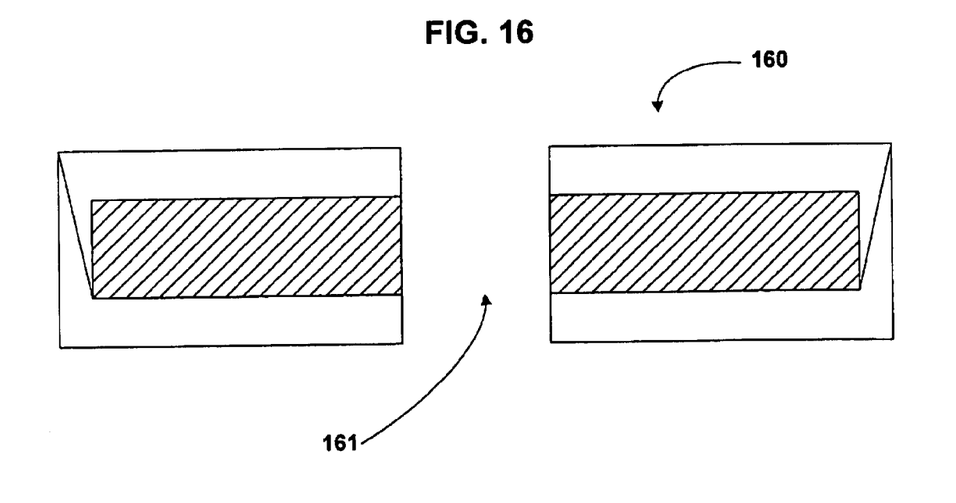

FIGS. 15 and 16 are additional cross-sectional side views of different types of exemplary holographic data storage media according to embodiments of the invention. In particular, as shown in FIG. 15 holographic data storage medium 150 does not include a hub, and as shown in FIG. 16 holographic data storage medium 160 defines a center hole 161. For example, center hole 161 may be punched after medium 160 is created. Center hole 161, for example, may correspond to the previous location of centerpieces. Thus, the centerpieces may be present to contain the holographic recording material during fabrication, but can be removed via center punching once the holographic recording material has cured. Referring again to FIG. 15, the thinned segment 144 between the centerpiece 142 and the rest of substrate 140 may facilitate removal of centerpiece 142 once the medium is created as described herein. Center punching may expose a portion of the holographic recording material to the environment. Accordingly, it may be desirable to coat center hole 161, or cover the hole with one or more hubs to provide an environmental barrier at the center hole 161.

Figure 17:
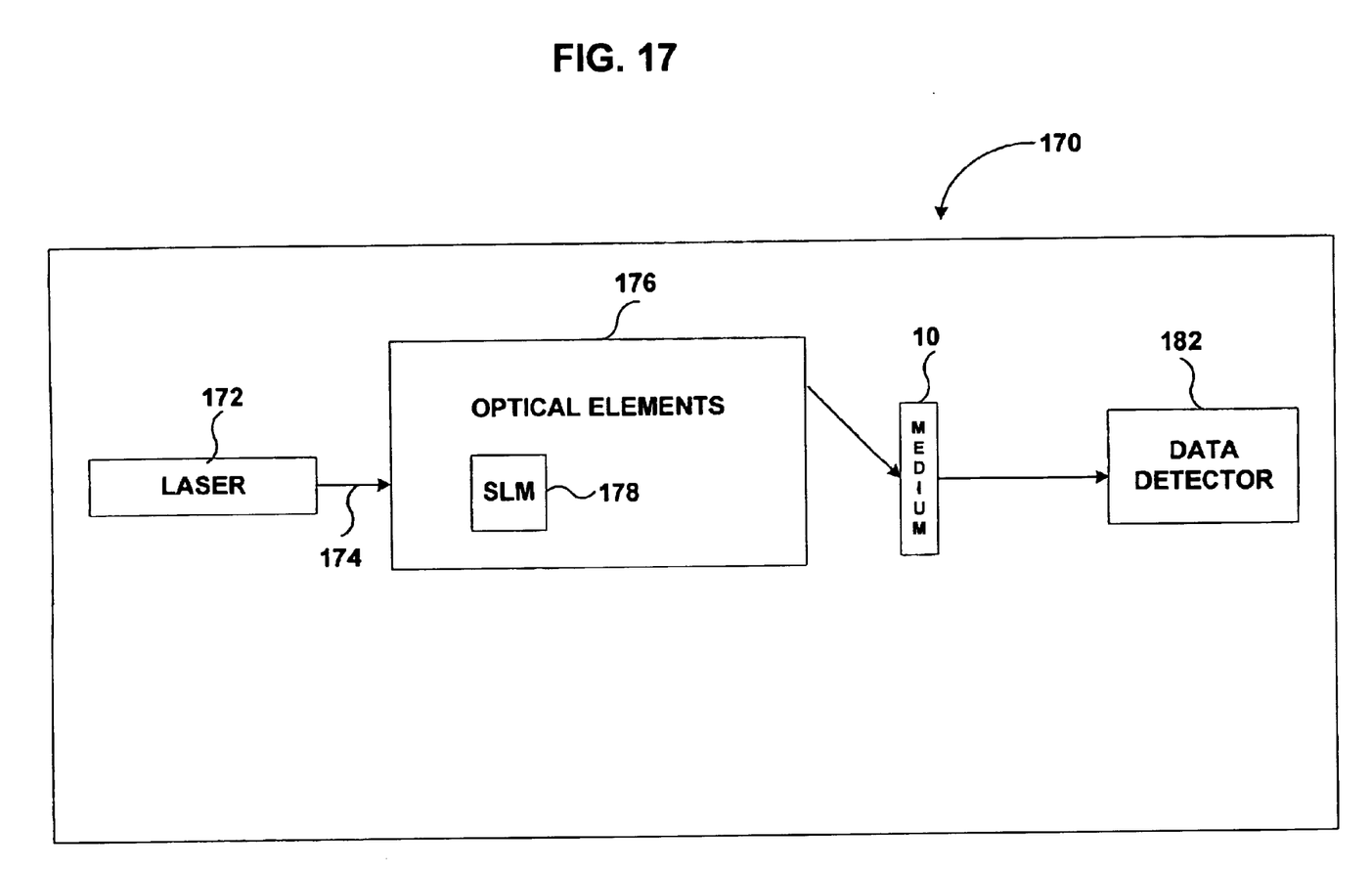
FIG. 17 is a block diagram of a holographic data storage system for reading and possibly writing to a holographic recording medium

FIG. 17 is a block diagram of a holographic data storage system for reading and possibly writing to a holographic recording medium. System 170 includes at least one laser 172 that produces laser light 174. Laser light 174 passes through optical elements 176. For instance, optical elements 176 may include one or more beam splitters, lenses and mirrors. A data encoder, such as spatial light modulator (SLM) 178, may be positioned within the optical elements to encode data in the laser light 174. Medium 10 is positioned where it can be written with holographic bit maps. Medium 10, for instance, may include one or more of the features described above, including fluid containment features and recessed centerpieces on one or both substrates. Data detector 182, such as a camera, is positioned to detect data encoded bit maps on medium 10.

In the system, at least one laser 172 may be carried on a record/read head (not shown). Additional lasers (not shown) may also be carried on the record/read head. In this manner, laser 172 may be properly positioned to read and write holograms on the medium 10.

The invention may be capable of providing advantages in holographic media. In particular, fluid containment features may simplify the manufacturing process, facilitate mass production, improve media quality in terms of structural integrity of the media, and may also improve environmental stability. Recessed centerpieces may also simplify the manufacturing process and improve media quality by simplifying and improving the ability to achieve substantial parallelism between outer surfaces of substrates used in a sandwiched construction medium.

Various embodiments of the invention have been described. For example, a variety of different substrate features have been described for use in a holographic data storage medium. Nevertheless, various modifications may be made without departing from the scope of the following claims. For example, the invention may be implemented in any medium that requires containment of a viscous material during the manufacturing process. In addition, one or more of the substrate features described herein may find useful application in media that includes only a single substrate. These and other embodiments are within the scope of the following claims.

What is claimed is:

1. A holographic data storage medium comprising:
   a first substrate including a first fluid containment feature formed in proximity to an outer edge of the first substrate;
   a second substrate including a second fluid containment feature formed in proximity to an outer edge of the second substrate, wherein the first and second substrates define a cavity; and
   a holographic recording material in the cavity between the first and second substrates, wherein the first fluid containment feature extends outward from the first substrate toward the second substrate by a distance approximately equal to a thickness of the cavity.

2. The holographic data storage medium of claim 1, wherein the second fluid containment feature extends outward from the second substrate toward the first substrate by a distance greater than the thickness of the cavity.

3. The holographic data storage medium of claim 2, wherein the holographic recording material is cured within the cavity, the cavity being defined by inner surfaces of the first and second substrates and an inner surface of at least one of the first and second fluid containment features.

4. The holographic data storage medium of claim 3, wherein the first and second fluid containment features abut one another to substantially seal the cavity.

5. The holographic data storage medium of claim 3, wherein the first and second fluid containment features define a vent gap during fabrication of the medium that allows gas to escape from the cavity when the holographic recording material recording material is injected between the first and second substrate.

6. The holographic data storage medium of claim 1, further comprising a first centerpiece formed at a center of the first substrate, and a second centerpiece formed at a center of the second substrate, the first centerpiece being recessed relative to an outer surface of the first substrate and the second centerpiece being recessed relative to an outer surface of the second substrate.

7. The holographic data storage medium of claim 6, wherein at least one of the first and second centerpieces defines an injection channel through which the holographic recording material can be injected during fabrication of the medium.

8. A first substrate for use in a sandwiched construction data storage medium in which a viscous material is sandwiched in a cavity between the first substrate and a second substrate during fabrication of the medium, the first substrate including a fluid containment feature formed in proximity to an outer edge of the first substrate, wherein the fluid containment feature extends outward from the first substrate toward the second substrate by a distance approximately equal to a thickness of the cavity.

9. The first substrate of claim 8, wherein the fluid containment feature defines a lip-like element formed about the outer edge of the first substrate.

10. The first substrate of claim 8, wherein the first substrate includes a centerpiece formed at a center of the first substrate, the centerpiece being recessed relative to an outer surface of the first substrate.

11. A first substrate for use in a sandwiched construction data storage medium in which a viscous material is sandwiched between the first substrate and a second substrate during fabrication of the medium, the first substrate including a fluid containment feature formed in proximity to an outer edge of the first substrate, wherein the first substrate includes a centerpiece formed at a center of the first substrate, the centerpiece being recessed relative to an outer surface of the first substrate, and wherein the centerpiece defines an injection channel through which the holographic recording material can be injected during fabrication of the medium.

12. A set of substrates for use in a sandwiched construction data storage medium in which a viscous material is sandwiched in a cavity between a first substrate and a second substrate during fabrication of the medium, the set of substrates comprising:
   a first substrate including a first fluid containment feature formed in proximity to an outer edge of the first substrate; and
   a second substrate including a second fluid containment feature formed in proximity to an outer edge of the second substrate, wherein the first and second substrates are positioned relative to one another to define the cavity for the viscous material, and wherein the first fluid containment feature extends outward from the first substrate toward the second substrate by a distance approximately equal to a thickness of the cavity.

13. The set of claim 12, wherein the second fluid containment feature extends outward from the second substrate toward the first substrate by a distance greater than the thickness of the cavity.

14. The set of claim 13, wherein the first and second fluid containment features abut one another to substantially seal the cavity.

15. The set of claim 13, wherein the first and second fluid containment features define a vent gap during creation of the medium that allows gas to escape from the cavity during creation of the medium.

16. The set of claim 12, wherein the first and second substrates respectively include first and second centerpiece formed at the centers of the first and second substrates, the first centerpiece being recessed relative to an outer surface of the first substrate and the second centerpiece being recessed relative to an outer surface of the second substrate.

17. The set of claim 16, wherein at least one of the first and second centerpiece defines an injection channel through which the viscous material can be injected during fabrication of the medium.

18. A holographic data storage system comprising:
 a laser that produces at least one laser beam;
 optical elements through which the laser beam passes;
 a data encoder that encodes data in at least part of the laser beam;
 a holographic recording medium that stores at least one hologram, the holographic recording medium comprising:
 a first substrate including a first fluid containment feature formed in proximity to an outer edge of the first substrate;
 a second substrate including a second fluid containment feature formed in proximity to an outer edge of the first substrate, wherein the first and second substrates define a cavity; and
 a holographic recording material in the cavity between the first and second substrates, wherein the first fluid containment feature extends outward from the first substrate toward the second substrate by a distance approximately equal to a thickness of the cavity.

19. The holographic data storage system of claim 18, wherein the second fluid containment feature extends from the second substrate by a distance greater than the thickness of the cavity.

20. The holographic data storage system of claim 18, wherein the first and second substrates respectively include first and second centerpiece formed at the centers of the first and second substrates, the first centerpiece being recessed relative to an outer surface of the first substrate and the second centerpiece being recessed relative to an outer surface of the second substrate, wherein at least one of the centerpieces defines an injection channel through which the holographic recording material can be injected during fabrication of the medium.

21. A method comprising:
 positioning a first substrate relative to a second substrate to define a cavity, the first substrate including a first fluid containment feature formed in proximity to an outer edge of the first substrate, and the second substrate including a second fluid containment feature formed in proximity to an outer edge of the second substrate such that the cavity is defined by inner surfaces of the first and second substrates and at least one of the first and second fluid containment features wherein the first fluid containment feature extends outward from the first substrate toward the second substrate by a distance approximately equal to a thickness of the cavity;
 injecting a viscous holographic recording material into the cavity; and
 curing the holographic recording material.

22. The method of claim 21, further comprising venting the cavity during injection of the viscous holographic recording material via a vent gap formed between the first and second fluid containment features.

23. A holographic data storage medium comprising:
 a first substrate including a first centerpiece formed at a center of the first substrate, the first centerpiece being recessed relative to an outer surface of the first substrate, wherein the first centerpiece defines a injection channel through which the holographic recording material can be injected during fabrication of the medium;
 a second substrate; and
 a holographic recording material between the first and second substrates.

24. The holographic data storage medium of claim 23, wherein the second substrate includes a second centerpiece formed at a center of the second substrate, the second centerpiece being recessed relative to an outer surface of the second substrate.

25. The holographic data storage medium of claim 23, wherein the first substrate includes a first fluid containment feature formed in proximity to an outer edge of the first substrate.

* * * * *